US012255671B2

(12) United States Patent
Chantz et al.

(10) Patent No.: US 12,255,671 B2
(45) Date of Patent: Mar. 18, 2025

(54) SEPARABLE, INTELLIGIBLE, SINGLE CHANNEL VOICE COMMUNICATION

(71) Applicant: INTERNATIONAL BUSINESS MACHINES CORPORATION, Armonk, NY (US)

(72) Inventors: Hyman David Chantz, Scarsdale, NY (US); Robert Lynch, Bedminster, NJ (US); Elijah Swift, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 117 days.

(21) Appl. No.: 18/122,272

(22) Filed: Mar. 16, 2023

(65) Prior Publication Data
US 2024/0313807 A1  Sep. 19, 2024

(51) Int. Cl.
H04B 1/00 (2006.01)

(52) U.S. Cl.
CPC .......... H04B 1/001 (2013.01); H04B 1/0075 (2013.01)

(58) Field of Classification Search
CPC ...... H04B 1/001; H04B 1/0003; H04B 1/005; H04B 1/0053; H04B 1/0028; H04B 1/0035; H04B 1/0042; H04B 1/0067; H04B 1/0075; H04B 1/0017; H04B 1/66; H04B 1/667
See application file for complete search history.

(56) References Cited

U.S. PATENT DOCUMENTS 3,564,142 A * 2/1971 Rothauser ................ H04B 1/66
704/264
3,571,515 A * 3/1971 Buron ..................... G10L 19/02
704/211

(Continued)

FOREIGN PATENT DOCUMENTS

AU   2020206724 A1   8/2021

OTHER PUBLICATIONS

Notification of Transmittal of the International Search Report and the Written Opinion of the International Searching Authority, or the Declaration for Application PCT/EP2024/0545009 dated May 21, 2024, 13 pages.

(Continued)

*Primary Examiner* — James M Perez
(74) *Attorney, Agent, or Firm* — James L. Olsen

(57) ABSTRACT

The method provides for separable subchannels sharing a communication channel. A processor receives input of a user setting a transmitter device to a first of at least two subchannels of a communication channel in which the first subchannel comprises a first portion of a bandwidth of the communication channel. The processor receives an audio signal as input to the transmitter device. The processor converts a time-series waveform of the audio signal into a frequency-series waveform. The processor determines that the transmitter device is set to the first subchannel. In response to determining the device is set to the first channel, the processor filters the frequency-series waveform through a series of steep shoulder digital bandpass filters set to transmit through the first portion of the bandwidth, and the processor transmits the audio signal as the filtered frequency-series waveform.

20 Claims, 4 Drawing Sheets

(56) References Cited

U.S. PATENT DOCUMENTS

| | | | | |
|---|---|---|---|---|
| 3,875,341 | A * | 4/1975 | Gassmann | G10L 21/038 704/E21.011 |
| 4,142,071 | A * | 2/1979 | Croisier | H04B 1/667 704/229 |
| 4,216,354 | A * | 8/1980 | Esteban | H04B 1/667 704/229 |
| 4,311,877 | A * | 1/1982 | Kahn | H04B 1/66 370/480 |
| 4,464,782 | A * | 8/1984 | Beraud | H04B 1/667 704/229 |
| 4,479,213 | A * | 10/1984 | Galand | H04B 1/667 370/522 |
| 4,569,075 | A * | 2/1986 | Nussbaumer | H04B 1/667 704/203 |
| 4,790,015 | A * | 12/1988 | Callens | G10L 19/24 704/E19.044 |
| 4,817,192 | A * | 3/1989 | Phillips | H04B 1/66 455/75 |
| 4,852,086 | A * | 7/1989 | Eastmond | H04B 1/68 375/216 |
| 4,955,083 | A * | 9/1990 | Phillips | H04B 1/66 375/321 |
| 5,148,487 | A * | 9/1992 | Nagai | H04B 1/667 704/265 |
| 5,212,817 | A * | 5/1993 | Atkinson | H03L 7/193 455/164.2 |
| 5,471,661 | A * | 11/1995 | Atkinson | H04B 1/0032 331/25 |
| 5,490,233 | A * | 2/1996 | Kovacevic | H04B 1/667 704/227 |
| 5,689,440 | A | 11/1997 | Leitch | |
| 5,701,598 | A * | 12/1997 | Atkinson | H04B 1/0003 455/260 |
| 5,745,523 | A * | 4/1998 | Dent | H04L 27/2017 375/219 |
| 5,970,453 | A * | 10/1999 | Sharman | G10L 13/07 704/260 |
| 6,002,352 | A * | 12/1999 | El-Ghoroury | H03M 1/208 341/139 |
| 6,072,994 | A * | 6/2000 | Phillips | H04B 1/0003 455/280 |
| 6,195,563 | B1 * | 2/2001 | Samuels | H04B 1/005 455/84 |
| 6,680,972 | B1 * | 1/2004 | Liljeryd | G10L 21/038 375/240 |
| 6,920,185 | B2 * | 7/2005 | Hinson | H04B 1/0003 455/313 |
| 6,925,116 | B2 * | 8/2005 | Liljeryd | H04B 1/667 375/240 |
| 7,283,955 | B2 * | 10/2007 | Liljeryd | H04B 1/667 704/219 |
| 7,328,162 | B2 * | 2/2008 | Liljeryd | G10L 21/038 704/503 |
| 7,756,497 | B2 * | 7/2010 | Skeie | H04B 1/0035 725/38 |
| 8,320,858 | B2 * | 11/2012 | Ruelke | H04B 1/0021 455/168.1 |
| 8,325,865 | B1 * | 12/2012 | Rofougaran | H04B 1/001 375/350 |
| 8,442,473 | B1 * | 5/2013 | Kaukovuori | H04B 1/005 375/324 |
| 8,483,647 | B2 * | 7/2013 | Kaukovuori | H04B 17/309 455/550.1 |
| 8,497,940 | B2 * | 7/2013 | Green | H04R 3/005 348/484 |
| 8,542,616 | B2 * | 9/2013 | Staszewski | H03D 7/1483 370/295 |
| 9,374,116 | B2 * | 6/2016 | Nienaber | H04B 1/1036 |
| 9,479,206 | B2 * | 10/2016 | Nienaber | H04B 1/0014 |
| 9,991,875 | B2 * | 6/2018 | Gathman | H03H 11/126 |
| 10,491,575 | B2 * | 11/2019 | Verzun | H04L 9/0662 |
| 10,582,363 | B2 * | 3/2020 | El-Dinary | H04W 4/90 |
| 11,201,644 | B2 * | 12/2021 | Shattil | H04L 5/0023 |
| 11,502,738 | B2 * | 11/2022 | Chakraborty | H04B 7/0686 |
| 11,606,143 | B2 * | 3/2023 | Chantz | H04R 1/028 |
| 12,021,767 | B2 * | 6/2024 | Shahar | H04L 5/0098 |
| 12,028,138 | B2 * | 7/2024 | Nilsson | H04B 7/0617 |
| 2002/0080728 | A1 * | 6/2002 | Sugar | H04B 1/406 370/252 |
| 2003/0016701 | A1 * | 1/2003 | Hinson | H04N 7/102 370/480 |
| 2004/0078194 | A1 * | 4/2004 | Liljeryd | G10L 21/038 704/E21.011 |
| 2004/0078205 | A1 * | 4/2004 | Liljeryd | H04B 1/667 704/503 |
| 2004/0125878 | A1 * | 7/2004 | Liljeryd | H04B 1/667 375/242 |
| 2004/0158458 | A1 * | 8/2004 | Sluijter | H04B 1/665 704/201 |
| 2004/0240573 | A1 * | 12/2004 | Yuasa | H04B 1/0032 375/260 |
| 2007/0206701 | A1 * | 9/2007 | Paley | H04B 1/30 340/572.1 |
| 2007/0234394 | A1 * | 10/2007 | Skeie | H04B 1/0035 725/120 |
| 2008/0114251 | A1 * | 5/2008 | Weymer | A61B 8/4472 600/447 |
| 2010/0008338 | A1 * | 1/2010 | Tsfati | H04B 1/0067 455/41.2 |
| 2010/0091688 | A1 * | 4/2010 | Staszewski | H04L 27/3863 370/342 |
| 2011/0300885 | A1 * | 12/2011 | Darabi | H04B 1/005 455/500 |
| 2012/0120313 | A1 * | 5/2012 | Green | H04R 3/005 348/E7.001 |
| 2012/0129480 | A1 * | 5/2012 | Ruelke | H04B 1/0021 455/296 |
| 2012/0163438 | A1 * | 6/2012 | Fujii | H04B 1/1036 375/224 |
| 2012/0182948 | A1 * | 7/2012 | Huang | H04L 27/2614 370/329 |
| 2013/0130635 | A1 * | 5/2013 | Kaukovuori | H04B 1/005 455/226.1 |
| 2013/0130638 | A1 * | 5/2013 | Kaukovuori | H04B 1/16 455/323 |
| 2013/0226499 | A1 * | 8/2013 | Platt | G01R 31/3167 702/117 |
| 2013/0294219 | A1 * | 11/2013 | Peck | H04L 5/0041 370/210 |
| 2014/0119281 | A1 * | 5/2014 | Kummetz | H04W 72/23 370/328 |
| 2014/0220919 | A1 * | 8/2014 | Yang | H03J 7/02 455/192.2 |
| 2015/0188737 | A1 * | 7/2015 | Xu | H04L 25/08 375/350 |
| 2015/0244624 | A1 * | 8/2015 | Asiano | H04B 1/0003 370/235 |
| 2015/0263835 | A1 * | 9/2015 | Shattil | H04B 7/026 370/329 |
| 2015/0372699 | A1 * | 12/2015 | Talty | H04B 1/0003 455/569.2 |
| 2015/0372800 | A1 * | 12/2015 | Talty | H04L 5/1461 370/343 |
| 2017/0093626 | A1 * | 3/2017 | Afkhami | H04L 41/0816 |
| 2018/0048293 | A1 * | 2/2018 | Gathman | H03H 11/126 |
| 2018/0241727 | A1 * | 8/2018 | Verzun | H04L 63/102 |
| 2018/0279107 | A1 * | 9/2018 | El-Dinary | H04H 20/59 |
| 2019/0052577 | A1 * | 2/2019 | Li | H04B 1/0067 |
| 2019/0260505 | A1 * | 8/2019 | Milbar | H04H 20/30 |
| 2019/0273518 | A1 * | 9/2019 | Wang | H04B 1/0028 |
| 2019/0320499 | A1 | 10/2019 | Gumaer | |
| 2022/0069911 | A1 * | 3/2022 | Chantz | G10K 11/178 |
| 2022/0103316 | A1 * | 3/2022 | Shahar | H04L 5/0035 |
| 2023/0170973 | A1 * | 6/2023 | Nilsson | H04B 7/086 375/262 |
| 2024/0313807 | A1 * | 9/2024 | Chantz | H04B 1/04 |
| 2024/0333840 | A1 * | 10/2024 | Chantz | H04L 65/4061 |

(56) References Cited

U.S. PATENT DOCUMENTS

OTHER PUBLICATIONS

"The Communications Unit; All Hazards Communications Unit Self-Paced Briefing", The Communications Unit, US Department of Homeland Security, Downoaded from the Internet on Dec. 5, 2022, 41 pps.

"Two-Way Voice Recognition Instant Messenger (VRIM) With Network Voice Conversion Flexibility", An IP.com Prior Art Database Technical Disclosure, IP.com No. IPCOM000023999D, IP.com Electronic Publication Date: Apr. 1, 2004, Copyright: Sony Corporation; Sony Electronics Inc., 10 pps.

Biesiada, "Failure to Communicate: Orange County Wildfires Highlight Long Standing Emergency Communication Problems", Voice of OC, Published Dec. 21, 2020, 7 pps.

Caldwell et al., "Poor Police Radio Reception Caused Confusion in Texas School Shooting Response, Says Official", The Wall Street Journal, Jun. 4, 2022, 13 pps.

Carstens, "User to User Signaling (UUS) Supplementary Service Enriched Emergency Calls in Mobile Communication Systems", An IP.com Prior Art Database Technical Disclosure, IP.com No. PCOM000125880D, IP.com Electronic Publication Date: Jul. 25, 2005, Copyright: Siemens AG 2005, 3 pps.

Chassine, et al., "Priority Telecommunications Services for First Responders", Emergency Communications Forum, Department of Homeland Security, Office of Emergency Communications, vol. 15, spring 2015, 4 pps.

Inmarsat, "Satellite Communications (SATCOM) for First Responders", Inmarsat Government, © Inmarsat Government Inc. 2018, All rights reserved Dec. 2018, 12 pps.

Method for Robust, Deterministic, and Certifiable Spectrum Sharing for Certified Use in Safety Critical Use in Safety Critical Ad Hoc Mobile Network Communications, An IP.com Prior Art Database Technical Disclosure, IP.com No. IPCOM000239224D, IP.com Electronic Publication Date: Oct. 22, 2014, 6 pps.

Moore, "The First Responder Network and Next Generation Communications for Public Safety: Issues for Congress", Aug. 7, 2012, CRS Report for Congress, Prepared for Members and Committees of Congress, Congressional Research Service, 28 pps.

\* cited by examiner

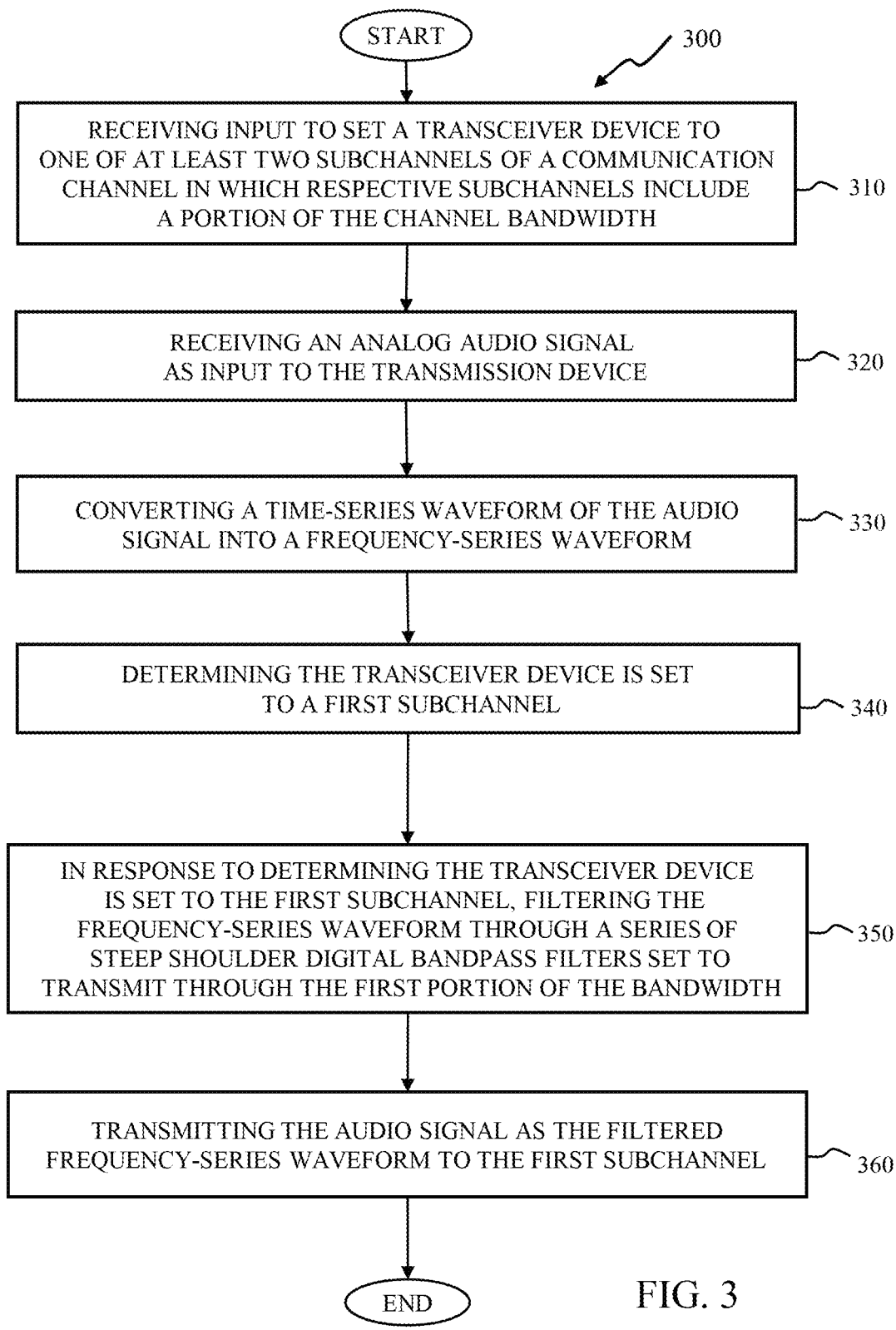

SEPARABLE, INTELLIGIBLE, SINGLE CHANNEL VOICE COMMUNICATION

BACKGROUND

The present invention relates to voice communication over radio frequencies, and more specifically to a separable analog voice path for communications to two or more separable receiver groups sharing a communication channel.

Voice radio transmission includes recreational users, commercial voice and music radio broadcasts, first responder groups, and other users. Many tactical radio systems, such as those used by first responders, use a compressed scheme of "Voice Grade" bandwidth range between 300 Hertz (Hz) and 3000 Hz.

Amplitude modulation carries an information signal by varying the amplitude of the carrier wave, whereas frequency modulation involves varying the frequency of the carrier wave in accordance with the amplitude of the information signal. Radio transmissions produce an analog signal corresponding to voice or sound input, convert the analog signal to a digital signal by digital signal processing, and convert-back to an analog signal at a receiver device that projects the voice or sound through a speaker.

In emergency situations, it is often necessary to include multiple first responder sources to assess, determine appropriate actions, and determine roles, priorities, and leadership if the response. Responders may include local, county, state, and even federal law enforcement agencies, and/or firefighting responders from multiple districts. Additionally, emergency medical responders from multiple sources as well as hospital staff recipients may be alerted and included in certain emergency situations. Repeated experience has indicated that coordination and effective communication in such situations with multiple first responder groups is lacking, resulting in confusion, delays in taking action, and in some cases pursuit of conflicting activity.

A significant aspect contributing to the communication issues includes sharing of audible communication bandwidth on emergency service frequencies among all responders. Often the audible bandwidth becomes saturated with messages transmitted broadly requiring each responding unit to determine relevance to their unit, or more commonly, multiple messages are simultaneously transmitted resulting in unintelligible communication. Efforts to avoid communication issues by using separate channels isolates communications to responding groups intended to coordinate and work together in response to the emergency situation. Dispatching and coordination of communications becomes complex and time consuming in situations where response time may be critical, and clear and directed communications vital.

A need exists to provide communications across multiple first responder units that is enabled to direct communication to particular first responder types, avoid overlay of simultaneous communications, and still enable communications to all first responder types when appropriate and necessary.

SUMMARY

According to an embodiment of the present invention, a computer-implemented method, computer program product, and computer system are provided for audio communication performed by a processor by setting a transmitter device to a subchannel of a communication channel, in which the subchannel comprises a first portion of the bandwidth of the communication channel. The processor receiving an audio signal at the transmitter device and converting a time-series waveform of the audio signal into a frequency-series waveform. The processor determining that the transmitter device is set to the first subchannel. In response to the determining, the processor filtering the frequency-series waveform through a series of steep shoulder digital bandpass filters set to transmit through the first portion of the bandwidth, and the processor transmitting the audio signal as the filtered frequency-series waveform.

An advantageous aspect of the invention includes sharing portions of an audible bandwidth of a communication channel by two or more subchannels that are defined by segments of bandwidth interleaved across the communication channel bandwidth. The sharing of the communication channel bandwidth by defining subchannels enables directed communications specifically to a subchannel associated with a particular first responder group without broadcasting the message to group for which the message is not intended.

An advantageous aspect of the invention includes defining segments of the communication bandwidth associated with a subchannel of the communications channel that are bordered with small guard bandwidths protecting the communication with one subchannel from interference or other impacts from other subchannels. In some embodiments, a guard bandwidth of 10 Hertz (Hz) is applied below and above each segment of bandwidth assigned to a subchannel.

An advantageous aspect of the invention includes conversion of a time-series waveform of an audio signal to a frequency-based series waveform and filtering the frequency-series waveform through a series of steep shoulder digital bandpass filters. The steep shoulder digital bandpass filtering enables capture of portions of the audible signal to be directed to a designated subchannel and provide adequate audible signal to be reproduced intelligibly at a receiver device.

An advantageous aspect of the invention includes transmitting a designated portion of the audible bandwidth as the filtered frequency-series waveform of the audible signal. Designating a portion of the communication channel bandwidth to each of two or more subchannels enables sharing of the communication channel and preserving a targeted transmission to a subchannel, eliminating simultaneous transmissions and confusion as to the intended recipients.

An advantageous aspect of the invention includes selection of a subchannel of the single communications audible channel to direct a transmitted message to be received by a particular first responder type having selected the same subchannel on receiving devices, and other first responder types having selected a different subchannel, do not receive the transmitted message on their respective receiving devices.

Another advantageous aspect of the invention includes transmitting a message to all segmented portions of the bandwidth to include all first responder types in receiving the transmitted message regardless of the selection of subchannels. In some situations, all first responders are intended recipients of messages, such as evacuation commands, or awareness of previously unknown dangers or risks. Embodiments of the present invention remain enabled to transmit across the entire bandwidth of the audible communication channel, which enables all subchannels to receive the transmissions. Current communications experience confusion and ineffectiveness as to clearly defining intended recipients due to audible messages for particular first responder groups are often transmitted to and received by all first responders.

Embodiments of the present invention recognize that the above-recited advantageous aspects, among others, solve and/or improve current problems experienced by first responders to emergency situations.

BRIEF DESCRIPTION OF THE DRAWINGS

FIG. 3 is a flowchart depicting the operational steps of a separable subchannel program, in accordance with embodiments of the present invention.

DETAILED DESCRIPTION

Figure 1:
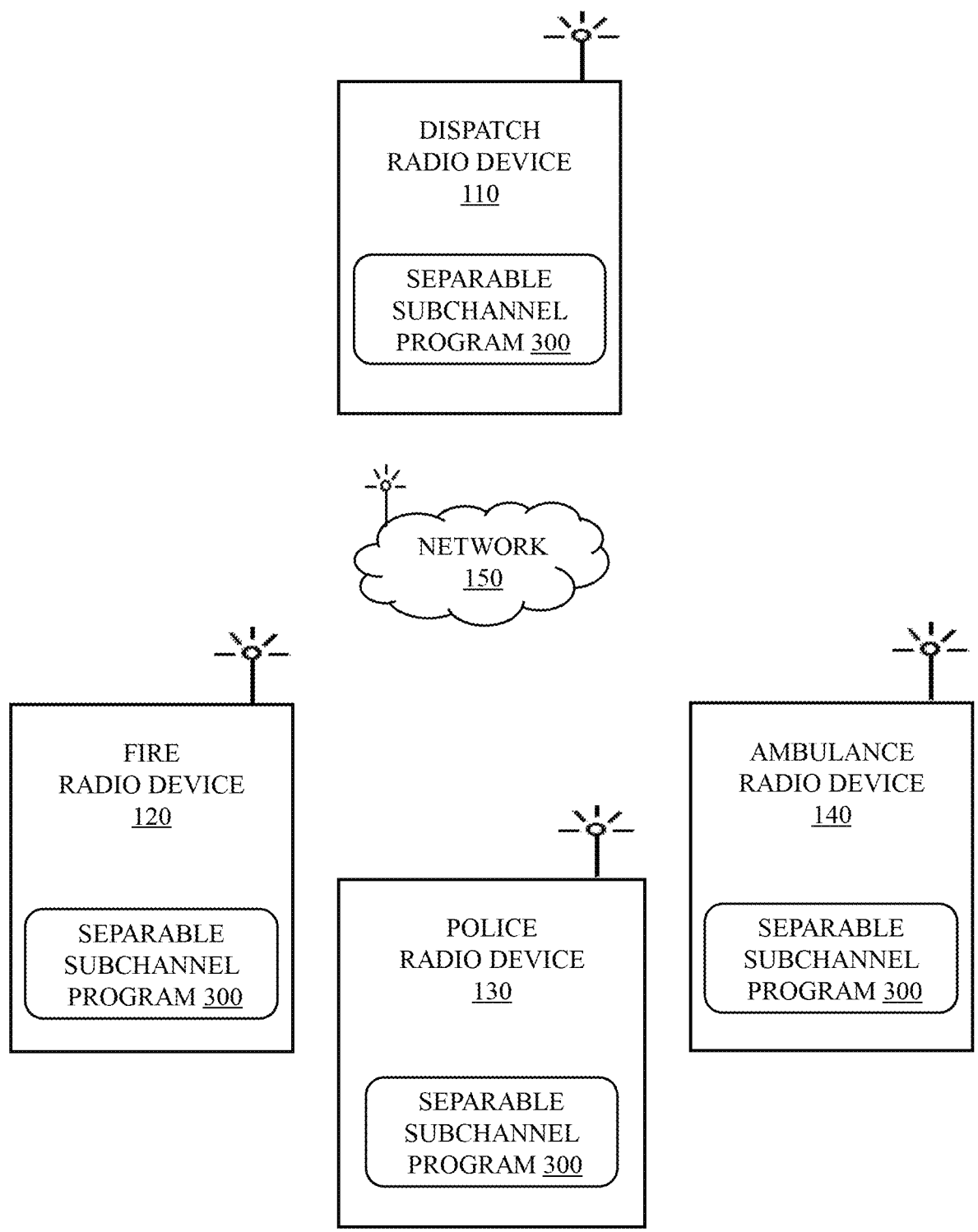
FIG. 1 is a functional block diagram illustrating a distributed data processing environment, in accordance with an embodiment of the present invention.

Embodiments of the present invention recognize that emergency situations involving multiple types of first responders can be complicated and sometimes exacerbated by a lack of communication acknowledgement of situational reports and operational commands caused in part by use of disparate communication networks and difficulties establishing end-to-end communications across all first responder groups. Embodiments of the present invention also recognize that some critical situations require communication orders to a specific first responder group (i.e., police/law enforcement), whereas in other situations communication orders need to reach all first responder groups immediately. Significant investment has been made historically to integrate a variety of first-responder systems, with limited success.

Embodiments of the present invention recognize that most first responder groups share a common functionality of receiving analog audio frequency bands typically in the speech/sound (i.e., voice) range of 300 Hz-3000 Hz and transmitting the received analog audio input by conversion to radio transmission signals, which are then received by devices that convert the radio transmissions back to audible sound emitted from a speaker component. First responder groups can experience a lack of inter-communication due to separate transmissions and separate dispatching for different responder groups combined on the same receiving communication channel, or confusion from overlayed transmissions combining different responder groups without the means to determine the intended audience. Embodiments of the present invention recognize that in complex emergency situations, (e.g., damage from severe weather, earthquakes, train derailments, etc.) accurate and complete communication among first responder groups, such as fire and police responders, is vital to rapid effectiveness, and interoperability between groups is critical, when necessary, but can be distracting and confusing if not needed.

Embodiments of the present invention provide a computer-implemented method, computer program product, and computer system enabling two or more distinct voice contents on one shared analog channel transmitted between radio devices, while permitting selection of cross-channel message reception in required situations. The shared aspect of the disclosed invention enables directing transmission of messages to intended first responder groups connected to a first subchannel and omitting receipt of messages to first responder groups receiving transmission on a second subchannel of the communication channel. Embodiments of the present invention utilize the 2700 Hz bandwidth of a compressed "voice grade" range (i.e., 300 Hz-3000 Hz) creating distinct subchannels, each defined by a portion of the analog bandwidth. However, embodiments of the present invention are not limited to utilizing the 2700 Hz bandwidth of a compressed "voice grade" range, and other bandwidths lower than or higher than 2700 Hz may also be contemplated.

An aspect of the disclosed invention includes segmenting the communication channel bandwidth into smaller bandwidth ranges, for example, 50 Hz segments of bandwidth, and interleaving the segments of two or more subchannels to enable sharing of the communication channel while targeting transmitted audible messages to receiving devices of first responders set to the targeted subchannel. The segmenting of the full communication channel bandwidth in an interleafed manner enables reproduction of the audible signal of a message while enabling a separately shared communication channel. Current techniques and methods lack the sharing of a single audible communication channel.

An aspect of the disclosed invention includes a guard portion of the channel bandwidth that brackets segmented interleaved ranges comprising two or more subchannels, with each subchannel directed to a particular first responder group, such as fire fighters or law enforcement police, and guard portions that protect from transmission overlap and overlaid audible signals.

An aspect of the disclosed invention includes a manufacturer-agnostic method for first responders to select reception of only a particular first responder group's communications, or as needed or required, receive communications of two or more first responder groups, and retaining the capability of central dispatching services to communicate as necessary to each or all first responder groups.

Another aspect of the disclosed invention includes successful implementation regardless of the radio equipment or carrier technology used (e.g., AM, FM, Digital, PSK, etc.). For purposes of clarity and comprehension of the features of embodiments of the present invention, references and examples will be made, herein, to two first responder groups, fire fighters (fire), and law enforcement (police), however, it is noted that embodiments are not limited to two first responder groups, nor to the selected first responder group.

An aspect of the invention includes an audio frequency guard element, for example 10 Hz, that brackets a segment range of a first responder group (e.g., police). For example, a 10 Hz guard element followed by a 50 Hz frequency range within the 300 Hz to 3000 Hz bandwidth, with the 50 Hz segment range followed by another guard element of 10 Hz. The segment range and bracketing guard elements may be arranged in an interleaving manner, alternating first responder groups. For example, the captured analog voice range may begin with a 10 Hz guard element (300 Hz-310 Hz), followed by a 50 Hz police segment range of the bandwidth (311 Hz-350 Hz), followed by a 10 Hz guard element (351 Hz-360 Hz), followed by a 50 Hz fire segment range of the bandwidth (361-410 Hz), which is then followed by a 10 Hz guard element (411 Hz-420 Hz). The sequence repeating multiple times within the 2700 Hz bandwidth. It is noted that the fire and police segmented ranges are interlaced within the analog audio channel bandwidth. The 2700 Hz bandwidth comprises the core channel of analog audio which is survivable among many transmission hops in various equipment types, and adequate for all audio communications.

An aspect of the invention includes a high level of survivability of the 2700 Hz audio spectrum bandwidth regardless of the various sources, handoffs, relays, and equipment differences involved in radio transmission and ultimately retransmitted, received and converted to an analog signal. Embodiments of the present invention acknowledges that the entire 2700 Hz is not required for intelligibility, given the interspaced segmented ranges for respective first responder groups with respective subchannels of the shared communication channel. By addressing the sharing aspect at the audible communication channel level, embodiments of the present invention utilize the robust audible signal, which is less affected by different relay handoffs or sources of the transmitted signal as compared to radio transmission frequencies.

Another aspect of the invention includes the filtering of frequency-series waveforms through a series of steep shoulder digital bandpass filters that are set to transmit and/or receive through the designated segment ranges of the communication channel ("the channel") bandwidth. The sharp demarcations between the end of one subchannel segment range (e.g., fire) and the beginning of another subchannel segment range (e.g., police) create a steep shoulder aspect of the subchannel. The use of a steep shoulder digital bandpass filters due to the demarcations of the segment ranges of a subchannel are not currently practiced within an audible communication channel bandwidth, which enables the sharing of the communication channel bandwidth, solving issues of selective communication to a particular first responder group while maintaining the ability to broadcast across all subchannels to all first responder receiving devices.

Embodiments of the present invention include a 10 Hz guard element bracketing the respective segment ranges (i.e., 50 Hz) as protection of an imperfect bandwidth. The filtering of the frequency-series waveform through a series of steep shoulder digital bandpass filters is replicated through the 2700 Hz bandwidth (e.g., 10 Hz guard, 50 Hz fire, 10 Hz guard, 50 Hz police, replicated through the bandwidth).

Another aspect of the invention includes enabling a selection of a particular subchannel or a combination of subchannels at a signal transmitting device and/or a signal receiving device. It is noted that radio devices are often configured to both transmit and receive radio signals for voice communication. Hereafter the term "transceiver" may be used to depict devices with capabilities of both transmission and reception of radio signals that are converted to analog signals and audio output from a speaker component of the respective device. Embodiments enable selection of one or more subchannels at the device level for either or both transmission and reception by applying digital audio filtering.

In an example embodiment of the present invention, if a central dispatcher wanted to contact all first responders on the shared communication channel, the dispatcher would broadcast (transmit) using the full 2700 Hz bandwidth, which would be received by all first responding group's devices set to some portion of the bandwidth. If fire first responders wanted to only receive audible messages related to fire first responders, they would make a selection on their respective transceiver devices to only receive audible messages designated for fire first responders (i.e., on the fire subchannel). The selection enables digital signal processing (DSP) of smoothed fire first responder designated messages. Similarly, with a different selection, police-only designated audible messages would be received on the police subchannel, while both fire and police first responders use the same radio communication channel. Embodiments of the present invention enable critical first responder group specific communications to be received without non-relevant communication interference.

In some embodiments, a field programmable gate array (FPGA) component of a transceiver device, configured to execute methods of the present invention, performs the analog to digital conversion and digital to analog conversion of audible analog signals. In other embodiments an application specific integrated circuit (ASIC) component of a transceiver device, configured to execute the methods described in the present invention, performs the conversions. In other embodiments, computer software programmed to execute the methods of the present invention through hardware components of the transceiver, accessed from or stored on the transceiver device, performs the analog to digital conversion and digital to analog conversion of audible analog signals. Embodiments of the present invention segment the bandwidth of the communication channel into two or more subchannels with bracketing frequency guard elements and define the frequency segment ranges associated with respective subchannels for separable use of the communication channel bandwidth.

The present invention will now be described in detail with reference to the Figures. FIG. 1 is a functional block diagram illustrating a distributed data processing environment, generally designated 100, in accordance with an embodiment of the present invention. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

FIG. 1 depicts distributed data processing environment 100 including block figures representing transceiver devices and an interconnecting network for the execution of at least some of the computer code involved in performing the inventive methods, such as separable subchannel program 300. Distributed data processing environment 100 includes dispatch radio device 110, fire radio device 120, police radio device 130 and ambulance radio device 140, all connected via network 150. Network 150 can be, for example, a local area network (LAN), a wide area network (WAN), such as the Internet, a virtual local area network (VLAN), a radio signal network operating as an amplitude modulation (AM) carrier wave, frequency modulation (FM) carrier wave, digital waveform, phase shift keying modulation (PSK), or any combination that can include wired, wireless, or optical connections. In general, network 150 can be any combination of connections and protocols that will support radio communication and data transmission between dispatch radio device 110, fire radio device 120, fire radio device 130, and ambulance radio device 140.

Dispatch radio device 110 is a transceiver device enabled to transmit and receive analog audible signals from a bandwidth of audible input from 300 Hz to 3000 Hz frequencies. Dispatch radio device 110 includes a microphone as a component to receive audible input which is converted to a digital signal and transmitted (not shown). Dispatch radio device 110 includes a speaker (not shown), as a component to output audible sound (i.e., voice) after conversion of received digital signals to analog audible signals. In some embodiments the microphone and speaker components are peripheral components to a dispatching system. In other embodiments dispatch radio device 110 includes the microphone and speaker as integrated components. Dispatch radio device 110 includes hardware and/or software components to convert analog audible signals that are input to digital signals for transmission to other radio devices, and convert digital signals received from other radio devices to analog audible signals for output by a speaker. Dispatch radio device 110 includes separable subchannel program 300.

Fire radio device 120 is a transceiver device enabled to transmit and receive analog audible signals from a bandwidth of audible input from 300 Hz to 3000 Hz frequencies. Fire radio device 120 includes a microphone as a component to receive audible input which is converted to a digital signal and transmitted (not shown). Fire radio device 120 includes a speaker (not shown), as a component to output audible sound (i.e., voice) after conversion of received digital signals to analog audible signals. In some embodiments the microphone and speaker components are peripheral components to a dispatching system. In other embodiments fire radio device 120 includes the microphone and speaker as integrated components. Fire radio device 120 includes hardware and/or software components to convert analog audible signals that are input to digital signals for transmission to other radio devices, and convert digital signals received from other radio devices to analog audible signals for output by a speaker. Fire radio device 120 includes separable subchannel program 300.

Police radio device 130 is a transceiver device enabled to transmit and receive analog audible signals from a bandwidth of audible input from 300 Hz to 3000 Hz frequencies. Police radio device 130 includes a microphone as a component to receive audible input which is converted to a digital signal and transmitted (not shown). Police radio device 130 includes a speaker (not shown), as a component to output audible sound (i.e., voice) after conversion of received digital signals to analog audible signals. In some embodiments the microphone and speaker components are peripheral components to a dispatching system. In other embodiments police radio device 130 includes the microphone and speaker as integrated components. Police radio device 130 includes hardware and/or software components to convert analog audible signals that are input to digital signals for transmission to other radio devices, and convert digital signals received from other radio devices to analog audible signals for output by a speaker. Police radio device 130 includes separable subchannel program 300.

Ambulance radio device 140 is a transceiver device enabled to transmit and receive analog audible signals from a bandwidth of audible input from 300 Hz to 3000 Hz frequencies. Ambulance radio device 140 includes a microphone as a component to receive audible input which is converted to a digital signal and transmitted (not shown). Ambulance radio device 140 includes a speaker (not shown), as a component to output audible sound (i.e., voice) after conversion of received digital signals to analog audible signals. In some embodiments the microphone and speaker components are peripheral components to a dispatching system. In other embodiments ambulance radio device 140 includes the microphone and speaker as integrated components. Ambulance radio device 140 includes hardware and/or software components to convert analog audible signals that are input to digital signals for transmission to other radio devices, and convert digital signals received from other radio devices to analog audible signals for output by a speaker. Ambulance radio device 140 includes separable subchannel program 300. It is noted that ambulance radio device 140 is depicted to indicate that more than two first responder groups may be included in embodiments of the present invention. Hereafter, for convenience and clarity of the features of the disclosed invention, discussion and examples will refer to two first responder groups without implying limitation.

Separable subchannel program 300 segments the "voice grade" bandwidth of the 300 Hz-3000 Hz communication channel into two or more distinct voice content subchannels on one shared analog communication channel while enabling selective use of one or a combination of subchannels. The subchannels correspond to respective first responder groups, for example, fire fighter first responders and police first responders. Separable subchannel program 300 creates interlaced segment ranges, repeating the segmented ranges throughout the communication channel bandwidth by alternating segments of first responder groups. For example, for two first responder groups corresponding to fire responders and police responders, separate subchannel program 300 creates a 50 Hz segment range for a fire responder subchannel alternating with a 50 Hz segment range for a police responder subchannel. Separable subchannel program 300 applies the fire and police 50 Hz segment ranges across the communication channel bandwidth, alternating fire, police, fire, police . . . etc. Separable subchannel program 300 includes separating subchannels segments by bracketing segment ranges with protective frequency guard element portions of the communication channel bandwidth, for example, creating a 10 Hz guard frequency range before and after each of the 50 Hz segment ranges of the fire and police subchannels. In some embodiments, separable subchannel program 300 includes a sequence of 10 Hz guard, 50 Hz fire segment range, 10 Hz guard, 50 Hz police segment range, 10 Hz guard, 50 Hz fire segment range, and so forth across the 2700 Hz bandwidth of the communication channel.

Figure 2A:
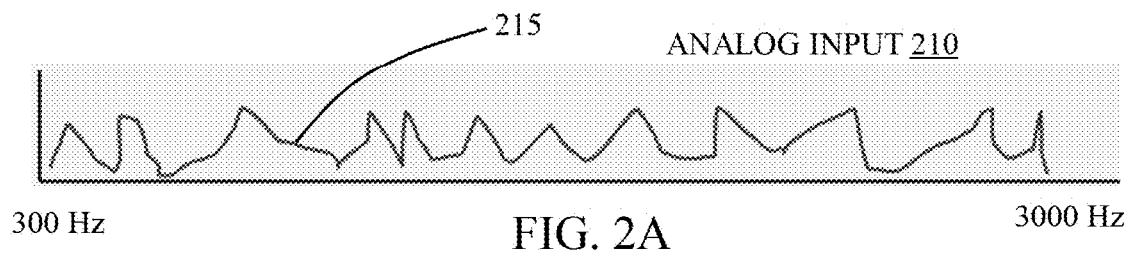
FIG. 2A is a functional block diagram depicting an analog frequency-series waveform signal, in accordance with an embodiment of the present invention.

FIG. 2A depicts an analog frequency-series waveform signal, in accordance with an embodiment of the present invention. FIG. 2A includes analog input 210 depicting analog signal 215 converted from a time-series waveform to a frequency-series waveform, across the bandwidth from 300 Hz-3000 Hz of the communication channel. In some embodiments, analog signal 215 is a voice initiated audible analog signal, captured and input by a microphone component of a transceiver device, such as dispatch radio device 110, fire radio device 120, police radio device 130, or ambulance radio device 140. Analog input 210 captures audible input (i.e., voice) in the frequency range of 300 Hz-3000 Hz as an analog signal.

Figure 2B:
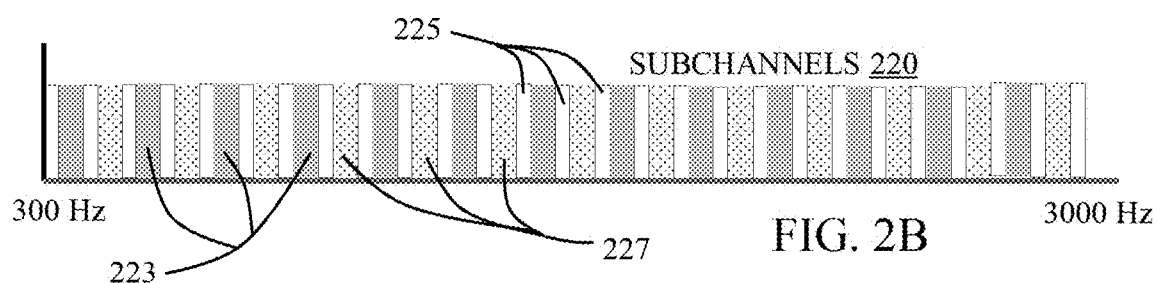
FIG. 2B is a functional block diagram depicting frequency segment ranges of subchannels, in accordance with an embodiment of the present invention.

FIG. 2B is a block diagram depicting frequency segment ranges of subchannels 220, in accordance with an embodiment of the present invention. Subchannels 220 is illustrated with segmented, interlaced subchannels ranges between frequencies 300 Hz and 3000 Hz. In embodiments of the present invention, the bandwidth of the communication channel extending from 300 Hz-3000 Hz is alternately divided into segment ranges, for example 50 Hz ranges. Each segment range corresponds to a subchannel associated with a first responder group, such as fire fighters, law enforcement police, or ambulance responders. For purposes of providing clarity of features of embodiments of the present invention, description and examples will be directed to subchannels corresponding to fire first responders and police first responders, noting that additional first responders, such as ambulance responders, may be included in embodiments of the present invention and benefit from the features and function described herein.

Subchannels 220 include guard elements 225, which provide a frequency range protection by bracketing the subchannel segment ranges, fire segment ranges 223 and police segment ranges 227, depicted as alternating, interlaced segment ranges. In some embodiments, guard elements 225 are comprised of a 10 Hz range, respectively, for example, from 300 Hz-310 Hz, and from 361 Hz-370 Hz, bracketing a subchannel segment range of 311 Hz to 360 Hz.

Figure 2C:
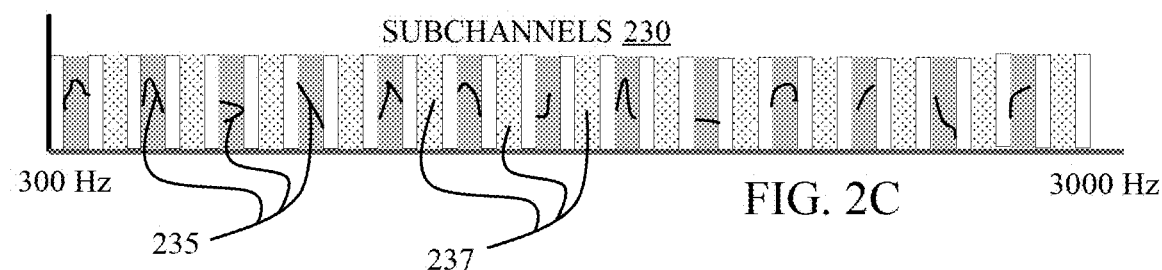
FIG. 2C is a functional block diagram depicting frequency segment ranges of subchannels, in accordance with an embodiment of the present invention.

FIG. 2C is a block diagram depicting frequency segment ranges of subchannels 230, in accordance with an embodiment of the present invention. Subchannels 230 are illustrated with segmented, interlaced subchannel ranges between frequencies 300 Hz and 3000 Hz and portions of the analog audible signal of analog input 210, converted by a Fast-Fourier Transform (FTT) from a time-series waveform into an analog, frequency-series waveform. Subchannels 230 include selection of the fire subchannel segment range frequency bands (i.e., first subchannel), which are depicted as including analog frequency-series waveform portions 235. Subchannels 230 also depict segment ranges of police subchannel 237 (i.e., second subchannel), which are not selected for transmission and are absent frequency band signals. In some embodiments, the analog frequency-series waveform portions 235, included in the fire subchannel segment range bands, are transmitted over a radio carrier wave, for example, by dispatch radio device 110.

Figure 2D:
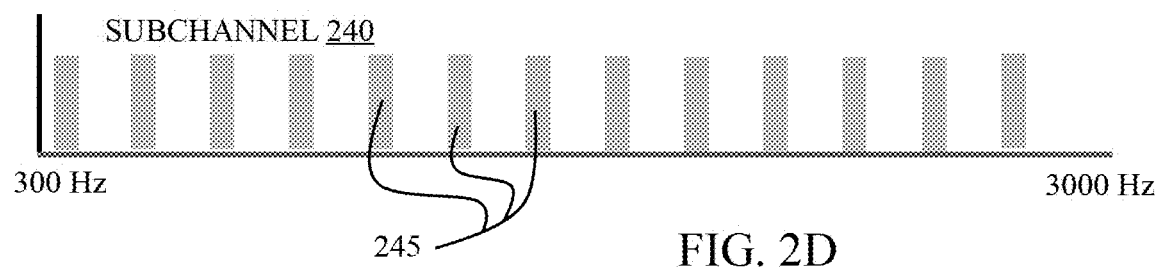
FIG. 2D is a functional block diagram depicting frequency segment ranges of a selected subchannel, in accordance with an embodiment of the present invention.

FIG. 2D is a block diagram depicting frequency segment ranges of selected subchannel 240, in accordance with an embodiment of the present invention. FIG. 2D includes fire subchannel segment ranges which have been selected, represented by subchannel segment ranges 245. A selection of subchannel 240 by a transmitting device operating separable subchannel program 300, limits transmission of the frequency-series waveform content to the fire subchannel, omitting transmission of content to the police subchannel, as depicted by the absence of the segment ranges of the police subchannel.

FIG. 3 is a flowchart depicting operational steps of separable subchannel program 300, in accordance with an embodiment of the present invention. In some embodiments of the present invention, separable subchannel program 300 operates as a component of a transmitter device, such as dispatch radio device 110. In some embodiments, separable subchannel program 300 performs a series of steep shoulder digital bandpass filters that are set to transmit through a designated subchannel portion of the communication channel bandwidth. In other embodiments, separable subchannel program 300 applies a series of digital bandpass filters for reception and reconversion of transmitted signals from a designated subchannel portion of the communication channel bandwidth.

In at least some embodiments of the present invention, separable subchannel program 300 performs a set of steps, which may be performed in an order presented, may be performed in a different order than presented, and may include one or more additional steps, exclude one or more steps, or may repeat one or more steps.

Separable subchannel program 300 receives a selection of a setting of a transceiver device, by a user of the transceiver device, to one of at least two subchannels of a communication channel in which the respective subchannels includes a portion of the shared communication channel bandwidth (step 310). Separable subchannel program 300 receives a setting on the transceiver device by a user that designates transmission and/or reception on one of the two or more subchannels sharing the communication channel bandwidth of 300 Hz to 3000 Hz. The selected subchannel corresponds to a particular first responder group, such as, for example, fire fighter first responders. The received setting selecting one of the at least two subchannels excludes transmission or reception of signals designated for other portions of the communication channel corresponding to other first responder groups. In some embodiments, a selection of a setting may include transmission and/or reception of a combination of subchannels, including all subchannels.

For example, separable subchannel program 300 detects a setting on dispatcher radio device 110 that selects the first subchannel corresponding to fire fighter first responders. The first subchannel includes portions of the communication channel bandwidth that are segmented in 50 Hz segment bands and interlaced with other 50 Hz segments corresponding to other first responders. For example, the first subchannel segment bands may begin at 311 Hz-360 Hz and are bracketed by 10 Hz frequency guard elements. The first subchannel repeats with additional segment bands after at least a second subchannel segment band range. The selection of the setting designating the first subchannel filters transmissions and received signals to only those corresponding to the first channel segment bands of the communication channel bandwidth.

Separable subchannel program 300 receives an analog audio signal as input to the transmission device (step 320). In some embodiments, the analog audio signal is voice content from a user, which is received as input by a microphone component of a transmitting device. The transmitting device receives the analog voice input as a time-series waveform. The analog audio signal corresponds to frequencies within the communication channel bandwidth.

For example, a dispatcher operating dispatcher radio device 110 speaks into a microphone component of dispatcher radio device 110. The voice content is received by the microphone as an audio signal and processed as a time-series waveform corresponding to frequencies within the communication channel bandwidth.

Separable subchannel program 300 converts the received time-series waveform of the analog audio signal into a frequency-series waveform (step 330). Separable subchannel program 300 converts the time-series waveform into an analog, frequency-series waveform by a Fast-Fourier Transform, for example. In some embodiments, separable subchannel program 300 initiates the conversion by an FPGA or an ASIC component of the transmission device. In some embodiments, the conversion can be performed in an early audio-frequency stage, whereas in other embodiments the conversion may be done in radio-frequency stages of transmission. The frequency-series waveform is included in transmission of a radio carrier wave.

Separable subchannel program 300 determines the transceiver device is set to transmit audio signals on the first subchannel (step 340). Having converted the received analog audio input to a frequency-series waveform, separable subchannel program 300 determines the subchannel selection previously made by the user for transmission by the transceiver device. In some embodiments, the selection of the subchannel is made from a user interface action of the transceiver device and provides feedback of the selection made. In some embodiments, the determined subchannel selection is applied by separable subchannel program 300 to transmission and reception for the transceiver device. In other embodiments, the selection of subchannels for transmission and reception are separate selections. In yet other embodiments, the selection of subchannels may be a particular subchannel or a combination of subchannels, including all subchannels. Transmissions directed to one subchannel are digitally filtered by steep shoulder bandpass filters, such that the segment ranges of the communication channel bandwidth are selectively filtered for the selected subchannel, while other subchannels would be absent of content from the transmission.

For example, separable subchannel program 300 determines that dispatcher radio device 110 has been set to the first subchannel and provides filtering of the input analog signal to transmit to the segment range bands of the communication channel bandwidth corresponding to the first subchannel. In another example scenario, separable subchannel program 300 determines that fire radio device 120 is set to receive transmission on the first subchannel and filters transmission signals to receive and process signals from the first subchannel segment range bands of the communication channel bandwidth to audio output.

In response to determining the transmitter device is set to the first subchannel, separable subchannel program 300 filters the frequency-series waveform through a series of steep shoulder digital bandpass filters set to transmit through the first portion of the bandwidth (step 350). Separable subchannel program 300 filters the frequency-series waveform such that the signals are transmitted through the first portion of the communication channel bandwidth that corresponds to the segment range bands of first subchannel. The transmission directed to the first subchannel segment range bands is not transmitted through other subchannel segment range bands. In some embodiments, the first subchannel, which was selected, may corresponds to transmission across all subchannels, in which case all subchannel segment range bands of the communication channel bandwidth receive the transmission signals.

For example, having determined that the transceiver device is set to the first subchannel, separable subchannel program 300 operating on dispatch radio device 110, filters the frequency-series waveform from audio input through a series of steep shoulder digital bandpass filters that results in transmitting the filtered signal through the segment range bands corresponding to the first subchannel. Similarly, separable subchannel program 300 filters transmitted signals such that the respective transceiver receives and processes signals corresponding to the subchannel setting of the receiving device.

Separable subchannel program 300 transmits the audio signal as the filtered frequency-series waveform to the first subchannel (step 360). The filtered frequency-series waveform is transmitted through segment range bands corresponding to the first subchannel and are received by transceiver devices set to receive first subchannel content. Other subchannels sharing the bandwidth of the communication channel are void of signals due to the filtering of the frequency-series waveform limiting transmission to the first subchannel segment range bands.

Figure 4:
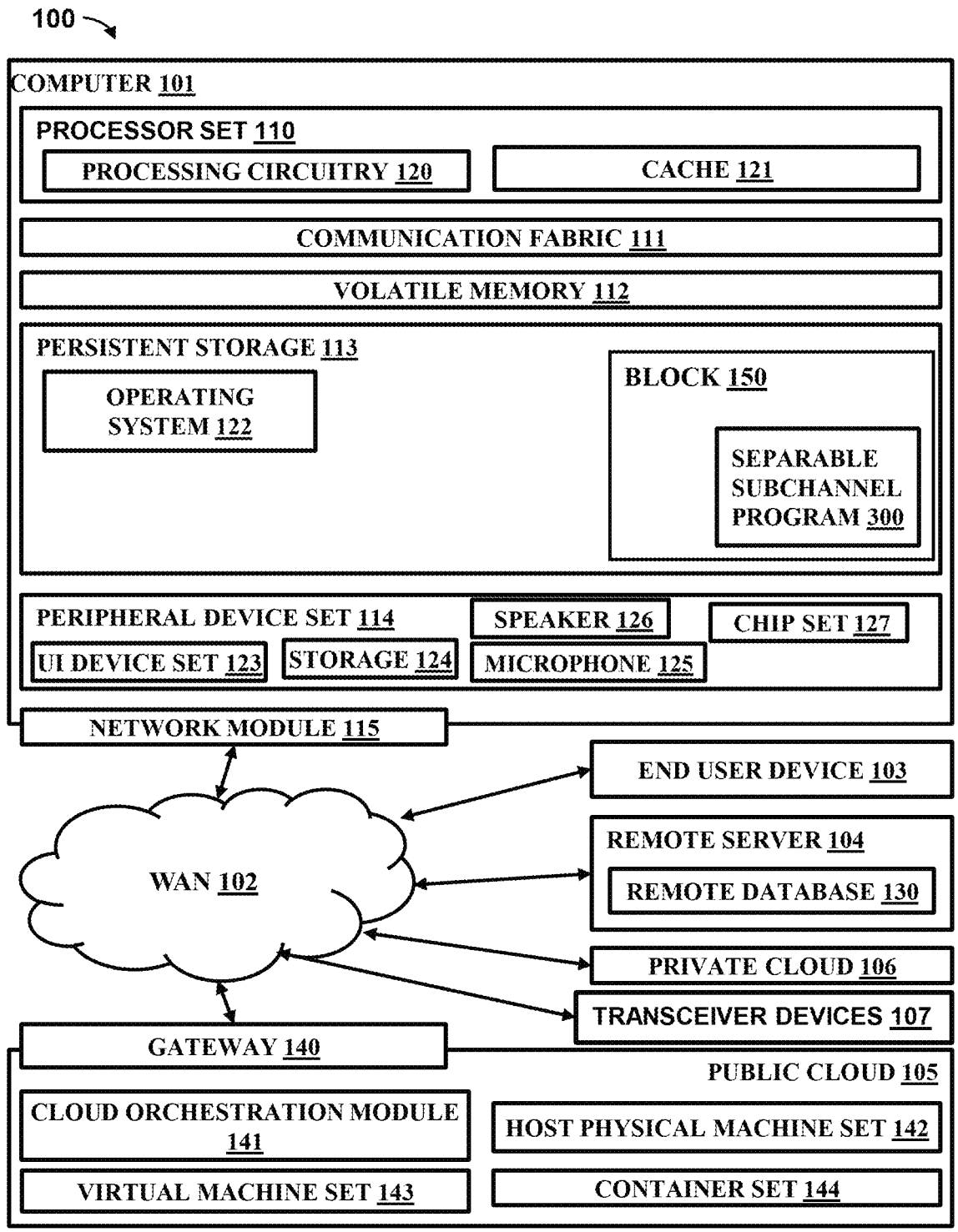
FIG. 4 depicts a block diagram of components of a computing system, including a computing device configured to operationally perform the separable subchannel program of FIG. 3, in accordance with an embodiment of the present invention.

FIG. 4 depicts a schematic illustration of exemplary network resources associated with practicing the disclosed inventions. The inventions may be practiced by the disclosed processors performing an instruction stream. As shown in FIG. 4, computing environment 100 contains an example of an environment for the execution of at least some of the computer code involved in performing the inventive methods, such as the method of separable subchannel program 300 in block 150, retained in persistent storage 113. In addition to block 150, computing environment 100 includes, for example, computer 101, wide area network (WAN) 102, end-user device (EUD) 103, remote server 104, public cloud 105, private cloud 106, and transmission connections to transceiver devices 107, which are configured to both transmit and receive audible communication signals by carrier wave. In this embodiment, computer 101 includes processor set 110 (including processing circuitry 120 and cache 121), communication fabric 111, volatile memory 112, persistent storage 113 (including an operating system 122 and separable subchannel program 300 of block 150, as identified above), peripheral device set 114 (including user interface (UI), device set 123, storage 124, microphone 125, speaker 126, chip set 127, and network module 115.

Microphone 125 receives audible input (i.e., voice sounds) that is further processed to time-series waveforms and further converted to frequency-series waveforms. Speaker 126 outputs audible sounds from converted time-series waveforms that are received by transceiver 107 or a receiving device. Chip set 127 includes one or both of an FPGA or ASIC integrated circuit enabling conversion of the time-series waveform to a frequency-series waveform. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smartphone, smartwatch or other wearable computer, mainframe computer, quantum computer, or any other form of computer or mobile device now known or to be developed in the future that is capable of running a program, accessing a network or querying a database, such as remote database 130. In some embodiments, computer 101 may take the form of a handheld device capable of receiving audible input and transmitting a converted radio signal of the audible input to other similarly configured devices set to receive the transmitted signal on the same subchannel of a communication channel. As is well understood in the art of computer technology, and depending upon the technology, the performance of a computer-implemented method may be distributed among multiple computers and/or between multiple locations. On the other hand, in this presentation of computing environment 100, a detailed discussion is focused on a single computing device, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby affect a computer-implemented method, such that the instructions thus executed will instantiate the methods specified in flowcharts and/or narrative descriptions of computer-implemented methods included in this document (collectively referred to as "the inventive methods"). These computer-readable program instructions are stored in various types of computer-readable storage media, such as cache 121 and the other storage media discussed below. The program instructions, and associated data, are accessed by processor set 110 to control and direct the performance of the inventive methods. In computing environment 100, at least some of the instructions for performing the inventive methods may be stored in separable subchannel program 300 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up buses, bridges, physical input/output ports, and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that are now known or to be developed in the future. The non-volatility of this storage means that the stored data is maintained regardless of whether power is being supplied to computer 101 and/or directly to persistent storage 113. Persistent storage 113 may be a read-only memory (ROM), but typically at least a portion of the persistent storage allows writing of data, deletion of data, and re-writing of data. Some familiar forms of persistent storage include magnetic disks and solid-state storage devices. Operating system 122 may take several forms, such as various known proprietary operating systems or open-source Portable Operating System Interface-type operating systems that employ a kernel. The code included in the representative block of separable subchannel program 300 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smartwatches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. Microphone 125 may be integrated with computer 101 or function as a peripheral component receiving audible signals. Speaker 126 may be integrated with computer 101 or function as a peripheral component. Speaker 126 receives time-series waveform signals and outputs audible sound. Chip set 127 performs conversions of audible signals to time-series waveform signals and from time-series waveform signals to frequency-series waveform signals. Chip set 127 may function to re-convert signals from frequency-series waveform to time-series waveform, to audible output.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer-readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers, and edge servers.

END USER DEVICE (EUD) 103 is any computer system that is used and controlled by an end user (for example, a customer of an enterprise that operates computer 101) and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer, and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs, and manages active instantiations of VCE deployments. Gateway 140 is the collection of computer software, hardware, and firmware that allows public cloud 105 to communicate through WAN 102.

Some further explanations of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community, or public cloud types), often respectively implemented by different vendors.

Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer-readable storage medium (or media) having computer-readable program instructions thereon for causing a processor to carry out aspects of the present invention.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer-readable program instructions for storage in a computer-readable storage medium within the respective computing/processing device.

Computer-readable program instructions for carrying out operations of the present invention may be assembler instructions, instruction-set-architecture (ISA) instructions, machine instructions, machine-dependent instructions, microcode, firmware instructions, state-setting data, configuration data for integrated circuitry, or either source code or object code written in any combination of one or more programming languages, including an object-oriented programming language such as Smalltalk, C++, or the like, and procedural programming languages, such as the "C" programming language or similar programming languages. The computer-readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer-readable program instructions by utilizing state information of the computer-readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer-readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the function/act specified in the flowchart and/or block diagram block or blocks.

The computer-readable program instructions may also be loaded onto a computer, other programmable data processing apparatus, or other device to cause a series of operational steps to be performed on the computer, other programmable apparatus or other device to produce a computer-implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method of audio communication comprising:
    setting, by a processor, a transmitter device to a first subchannel of a communication channel, wherein the first subchannel comprises a first portion of a bandwidth of the communication channel;
    receiving, by the processor, an audio signal as input to the transmitter device;
    converting, by the processor, a time-series waveform of the audio signal into a frequency-series waveform;
    determining, by the processor, that the transmitter device is set to the first subchannel;
    in response to determining the transmitter device is set to the first subchannel, filtering, by the processor, the frequency-series waveform through a series of steep shoulder digital bandpass filters set to bandpass the first portion of the bandwidth of the communication channel; and
    transmitting, by the processor and the transmitter device, the audio signal as the filtered frequency-series waveform through the first portion of the bandwidth of the communication channel.

2. The method of claim 1, wherein the filtered frequency-series waveform of the transmitted audio signal is received by a receiver device, wherein the receiver device is set to receive transmissions to the first subchannel of the communication channel and the transmitted audio signal is absent from a second receiver device set to receive transmissions to a second subchannel of the communication channel.

3. The method of claim 1, wherein a receiver device includes a setting enabling receipt of audio signals transmitted on the first subchannel and a second subchannel.

4. The method of claim 1, wherein a subchannel of the communication channel includes a guard band of frequency bandwidth below and above a segment range band of the subchannel bandwidth.

5. The method of claim 1, further comprising:
    setting, by the processor, the transmitter device to a full bandwidth of the communication channel;
    receiving, by the processor, a next audio signal at the transmitter device;

determining, by the processor, that the transmitter device is set to the full bandwidth of the communication channel; and in response to the determining that the transmitter device is set to the full bandwidth of the communication channel, transmitting, by the processor and transmitter device, the next audio signal over the full bandwidth of the communication channel.

6. The method of claim 5, wherein the next audio signal is received by a receiver device that is set to the first subchannel of the first portion of the bandwidth of the communication channel and by a receiver device that is set to a second subchannel of a second portion of the bandwidth of the communication channel.

7. The method of claim 1, further comprising:
setting, by the processor, the transmitter device to a second subchannel of the communications channel, wherein the second subchannel comprises a second portion of the bandwidth of the communication channel separated from the first subchannel by a guard portion of the bandwidth of the communication channel; and
transmitting, by the processor and the transmitter device, to the second subchannel, the audio signal as the filtered frequency-series waveform to a receiver device.

8. The method of claim 1, wherein the first portion of the bandwidth of the communication channel and a second portion of the bandwidth of the communication channel include multiple segmented ranges within the bandwidth of the communication channel in which each segmented range is bordered by a guard portion of the communication channel.

9. The method of claim 8, wherein the multiple segmented ranges include, respectively, a guard portion of the bandwidth of the communication channel of at least 10 Hz between segmented ranges, and the segmented ranges of the first subchannel and a second subchannel of the communication channel includes a bandwidth of the communication channel of at least 50 Hz, respectively.

10. The method of claim 1, further comprising:
receiving, by the processor of a first transceiver device, the filtered frequency-series waveform transmitted from a second transceiver device to the first subchannel;
converting, by the processor, the frequency-series waveform to the time-series waveform through a series of digital bandpass filters set to receive signals from the first subchannel corresponding to the first portion of the bandwidth of the communication channel; and
in response to determining the first transceiver device is set to the first subchannel, converting, by the processor and a speaker component of the first transceiver device, the time-series waveform to an audible sound corresponding to the audio signal input to a second transceiver device.

11. A computer system for audio communication, the computer system comprising:
one or more computer processors;
one or more computer-readable storage media, and program instructions stored on the one or more computer-readable storage media, the one or more computer processors when executing the program instructions are configured to:
set a transmitter device to a first subchannel of a communication channel, wherein the first subchannel comprises a first portion of a bandwidth of the communication channel;
receive an audio signal as input to the transmitter device;
convert a time-series waveform of the audio signal into a frequency-series waveform;
determine that the transmitter device is set to the first subchannel of the communication channel;
in response to determining the transmitter device is set to the first subchannel, filter the frequency-series waveform through a series of steep shoulder digital bandpass filters set to bandpass the first portion of the bandwidth of the communication channel; and
transmit the audio signal from the transmitter device as the filtered frequency-series waveform through the first portion of the bandwidth of the communication channel.

12. The computer system of claim 11, wherein the filtered frequency-series waveform of the transmitted audio signal is received by a first receiver device set to receive transmissions to the first subchannel of the communication channel and the transmitted audio signal is absent from a second receiver device set to receive transmissions to a second subchannel of the communication channel.

13. The computer system of claim 12, wherein the one or more computer processors are further configured to include a setting enabling the receiver device to receive audio signals transmitted on both the first subchannel and a second subchannel.

14. The computer system of claim 11, wherein the subchannel of the communication channel includes a guard band of a frequency bandwidth below and above a segment range band of the subchannel bandwidth.

15. The computer system of claim 11, the one or more computer processors are further configured to:
set the transmitter device to a full bandwidth of the communication channel;
receive a next audio signal at the transmitter device;
determine that the transmitter device is set to the full bandwidth of the communication channel; and
in response to the determining that the transmitter device is set to the full bandwidth of the communication channel, transmit the next audio signal over the full bandwidth of the communication channel.

16. The computer system of claim 15, wherein the next audio signal is received by a receiver device that is set to the first subchannel of the first portion of the full bandwidth of the communication channel and by a receiver device that is set to a second subchannel of a second portion of the full bandwidth of the communication channel.

17. The computer system of claim 11, wherein the first portion of the bandwidth of the communication channel and a second portion of the bandwidth of the communication channel include multiple segmented ranges within the bandwidth of the communication channel in which each segmented range is bordered by a guard portion of the communication channel.

18. The computer system of claim 17, wherein the multiple segmented ranges include, respectively, a guard portion of the bandwidth of the communication channel of at least 10 Hz between segmented ranges, and the segmented ranges of the first subchannel and a second subchannel of the communication channel include a bandwidth of the communication channel of at least 50 Hz, respectively.

19. The computer system of claim 11, the one or more computer processors are further configured to:
receive at a first transceiver device, the filtered frequency-series waveform transmitted from a second transceiver device to the first subchannel;
convert the frequency-series waveform to the time-series waveform through a series of digital bandpass filters set to receive signals from the first subchannel corresponding to the first portion of the bandwidth of the communication channel; and in response to determining the first transceiver device is set to the first subchannel of the communication channel, convert by a speaker component of the first transceiver device, the time-series waveform to an audible sound corresponding to the audio signal input to a second transceiver device.

20. A computer-implemented method for audio communication, the computer-implemented method comprising:

setting, by a processor, a receiving device to a first subchannel of a communication channel, wherein the first subchannel comprises a first portion of a bandwidth of the communication channel;

receiving, by the processor, on the receiving device a frequency-series waveform filtered through a series of steep shoulder digital bandpass filters that are set to multiple audible frequency segments corresponding to the first subchannel;

converting, by the processor, the frequency-series waveform to a time-series waveform;

converting, by the processor, the time-series waveform to an audible signal consistent with the multiple audible frequency segments of the bandwidth corresponding to the first subchannel of the communication channel, wherein a respective audible frequency segment includes at least a 50 Hz bandwidth interleaved with other 50 Hz bandwidths of other subchannels within a 300 hertz to 3000 hertz audible bandwidth of the communication channel; and receiving, by the processor, the audible signal at the receiving device.

* * * * *